(12) United States Patent
Wang

(10) Patent No.: US 7,620,092 B2
(45) Date of Patent: Nov. 17, 2009

(54) MULTIMODE MOPA WITH THERMAL LENS COMPENSATION

(75) Inventor: Gary Y. Wang, Fremont, CA (US)

(73) Assignee: Coherent, Inc., Santa Clara, CA (US)

( * ) Notice: Subject to any disclaimer, the term of this patent is extended or adjusted under 35 U.S.C. 154(b) by 84 days.

(21) Appl. No.: 11/807,424

(22) Filed: May 29, 2007

(65) Prior Publication Data

US 2007/0280325 A1    Dec. 6, 2007

Related U.S. Application Data

(60) Provisional application No. 60/811,374, filed on Jun. 6, 2006.

(51) Int. Cl.
*H01S 3/00* (2006.01)
*H01S 3/08* (2006.01)
(52) U.S. Cl. .......................... 372/101; 372/33
(58) Field of Classification Search ............... 372/33, 372/101
See application file for complete search history.

(56) References Cited

U.S. PATENT DOCUMENTS 4,910,746 A * 3/1990 Nicholson ............... 372/68
5,001,718 A * 3/1991 Burrows et al. ............ 372/33

OTHER PUBLICATIONS

S. Fujikawa et al., "1-kW high-quality beam generation from a diode-side-pumped Nd:YAG rod laser," *Paper WE-8, Advanced Solid-State Lasers*, 2002, Quebec City, Canada, 3 pages in length.
Text Book *Laser Resonators and Beam Propagation*, 2nd ed.—2005, chapter 13 "Resonators with Variable Internal Lenses," (see specifically 13.1 ("General Aspects") and 13.2 ("Stable Resonators")), published by Springer 2005, pp. 451-487.
J.T. Hunt et al., "Suppression of self-focusing through low-pass spatial filtering and relay imaging," *Applied Optics*, vol. 17, No. 13, Jul. 1, 1978, pp. 2053-2057.
V. Magni, "Resonators for solid-state lasers with large-volume fundamental mode and high alignment stability," *Applied Optics*, vol. 25, No. 1, Jan. 1, 1986, pp. 107-117.
D. Metcalf et al., "Laser resonators containing self-focusing elements," *Applied Optics*, vol. 26, No. 21, Nov. 1, 1987, pp. 4508-4517.

* cited by examiner

*Primary Examiner*—Armando Rodriguez
(74) *Attorney, Agent, or Firm*—Morrison & Foerster LLP

(57) ABSTRACT

A master oscillator power amplifier (MOPA) laser system includes a symmetrical master oscillator and an amplifier each having an optically pumped solid-state gain rod. An optical relay is located between the laser resonator and the amplifier gain rod. When the oscillator and amplifier gain media are equally optically pumped, the magnification and the distances from the optical relay to the resonator and the amplifier gain rod can be selected such that amplifier efficiency is maximized, independent of optical pump power, even if the diameters of the oscillator and amplifier gain rods are different.

17 Claims, 11 Drawing Sheets

MOPA with Single Pass Amplifier and Reflective Relay

MOPA
with Double Pass Amplifier

MULTIMODE MOPA WITH THERMAL LENS COMPENSATION

PRIORITY

This application claims priority U.S. Provisional Application, Ser. No. 60/811,374, filed Jun. 6, 2006, the disclosure of which is incorporated herein by reference.

TECHNICAL FIELD OF THE INVENTION

The present invention relates in general to laser systems including a master oscillator and a power amplifier (MOPA). The invention relates in particular to optical arrangements for coupling a beam from a master oscillator into a power amplifier.

DISCUSSION OF BACKGROUND ART

A master oscillator followed by one or more power amplifiers, the so-called MOPA structure, is frequently used in lasers that generate output powers with hundreds or thousands of watts. The output could be in the form of continuous amplitude without modulation in time, the so-called CW output, or of regulated Q-switched pulses.

In a MOPA laser, the master oscillator is used to generate an output that meets all requirements of the desired application. These requirements typically include low noise, a round beam with a good spatial mode profile without high-frequency structure, a low beam divergence ($M^2$) limit and/or a pulse width limit in Q-switched operation. The oscillator output power is, in most cases, low to medium, so that it can accept less robust optical components and advanced designs to achieve the above requirements. The oscillator output is sent to the power amplifier where the power level is magnified to the required level while maintaining the main characteristics of the oscillator output.

Mode matching optics are used between the oscillator and the amplifier to transfer the oscillator output beam to the amplifier laser rod(s) with a matched beam size so that most of the gain in the amplifier is utilized. In addition, the laser rod size of the amplifier has to be carefully chosen so that the power or energy density of the oscillator beam is higher than the saturation density to achieve high extraction efficiency. Other subtle considerations on the amplifier rod size selection include avoiding spatial mode as well as temporal profile distortion due to gain saturation.

Previous mode matching optics consist of either a single or multiple lenses or curved mirrors and have been demonstrated mostly in flashed lamp pumped Q-switched MOPA systems where repetition rates are in the order of 1-50 Hz (See, Norman Hodgson and Horst Weber, *Laser Resonators and Beam Propagation*, $2^{nd}$ ed., chapter 13.1 and 13.2, Springer 2005). In these low repetition-rate systems, each laser pulse is generated within each pump flash that lasts a few hundred microseconds. Within such a flash, thermal loading to the laser rod is not fast enough to spread out and establish an equilibrium thermal lens profile. Without sensing thermal lensing, the propagation parameters of the laser beam change very little as the pump power or repetition rate is readjusted. As a result, the mode matching optics optimized for a particular operating condition could be extended to the entire system operation.

In diode pumped or CW lamp pumped systems, the thermal lens created in the laser rods can no longer be ignored. In addition, as the pump power or repetition rate is adjusted during operation, the change in the focal length of the thermal lens can easily be on the order of tens of centimeters, thus creating a large change to the propagation parameters of the oscillator beam. In this case, the above-mentioned mode matching optics will no longer work. It is our desire to come up with a design for mode matching optics that addresses the presence of the thermal lenses in the rods. The mode matching optics should work to let the MOPA generate an output with high amplifier efficiency within a large range of pump power and repetition rate variations. It is also our desire that the optics function over a wide pump power operation range such that there is no need to readjust the mode matching optics to fit the different thermal lens values.

As noted above, in a CW diode or lamp pumped solid-state laser, the thermal lens heavily affects the propagation parameters of the output beam. These parameters include the beam size and the position of the waist if the output coupler is not flat. In addition, in most industrial applications, the pump power or repetition rate is frequently adjusted, for example, to suspend lasing operation between targets and to allow the laser beam to treat different work targets with different power density. In these cases, large thermal lens variations are induced. In a prior art MOPA system, wherein the output of the oscillator is sent to the amplifier by mode matching delivery optics, the change of propagation parameters due the changing thermal lens necessarily degrades the amplifier efficiency if the mode matching optics as either designed and optimized without the consideration of the thermal lens or optimized at only one value of pump power or repetition rate.

As noted above, a prior art system that uses a relay lens pair to image the oscillator rod(s) to the amplifier rod(s), will not work well in the presence of thermal lens. One prior approach used to address the problem included using an amplifier gain rod having the same diameter as the gain rod in the master oscillator. In the latter method, all amplifier optics and positions are rendered as images of the oscillator and the whole MOPA is viewed as two oscillators periodically repeated each other in space. Although this method can address the problem of pump power/thermal lens changes, the requirement of using a same rod diameter in the amplifier necessarily limits critical design criteria of the amplifier such as input beam power density and amplifier gain, compromising the MOPA efficiency.

It would be desirable to create a fixed optical system that would allow the MOPA to efficiently operate over a large range of pump powers. Further, it would be desirable if that system could be configured so that the laser can operate effectively even if the diameters of the rods in the oscillator and amplifier were different.

SUMMARY OF THE INVENTION

In one aspect, laser apparatus in accordance with the present invention comprises a laser resonator terminated by first and second mirrors. The second mirror serves as an outcoupling mirror of the resonator and defines an outcoupling plane of the laser resonator. An optically-pumped gain-medium is located in the laser resonator. The resonator gain-medium has a thermal lens effect, the magnitude of which is dependent on the power of the optical pumping. The laser resonator is arranged to deliver a beam of laser radiation from the second mirror thereof when said resonator gain-medium is optically pumped. The apparatus also includes an optical amplifier including an optically-pumped gain-medium and an optical relay. The optical relay is located between the laser resonator and the optical amplifier and arranged to deliver the beam of laser radiation from the second mirror of the resonator to the amplifier gain-medium. The relay magnification and the distance from the optical relay to the second mirror of the laser resonator are selected such that the outcoupling plane of the laser resonator is imaged by the optical relay in an axial position between the optical relay and the amplifier gain-medium.

In one preferred embodiment, the first and second mirrors are plane mirrors and the resonator gain-medium is symmetrically disposed between the mirrors. Optical pumping is of sufficient power that thermal lensing in the gain-medium maintains stable operation of the resonator.

In another aspect of the present invention, the magnification of the relay and the axial distances of the relay to the second mirror of the resonator and to the amplifier gain-medium can be selected such that, if the resonator medium and the amplifier gain-medium are equally optically pumped, the efficiency of the amplifier is essentially independent of optical pump power over the stable range of operation of the laser resonator. Preferably the optical relay includes first and second optical elements having positive optical power and having respectively first and second focal lengths. The optical elements are spaced apart by about the sum of the focal lengths, with the first optical element being spaced apart from the second mirror by about the first focal length, and the image of the outcoupling plane being spaced apart from the second optical element by about the second focal length. An optical element of the relay can be a lens or a mirror.

In yet another aspect of the present invention, the resonator gain-medium and the amplifier gain-medium can be of different transverse dimensions, and the magnification of the relay can be selected such that the amplifier gain-medium is filled by the laser beam. In an example wherein the resonator gain-medium is a rod having a first diameter and the amplifier gain-medium is a rod having a second diameter, the resonator is configured to have a magnification equal to the ratio of the second diameter to the first diameter.

In one preferred embodiment of the invention, the amplifier is a single-pass amplifier. In another preferred embodiment of the invention the amplifier is a double-pass amplifier. In yet another preferred embodiment of the invention the amplifier is one of two stages of amplification in the apparatus. Other aspects and embodiments of the invention will be evident to one skilled in the art from the description and drawings below.

DETAILED DESCRIPTION OF THE INVENTION

Figure 1:
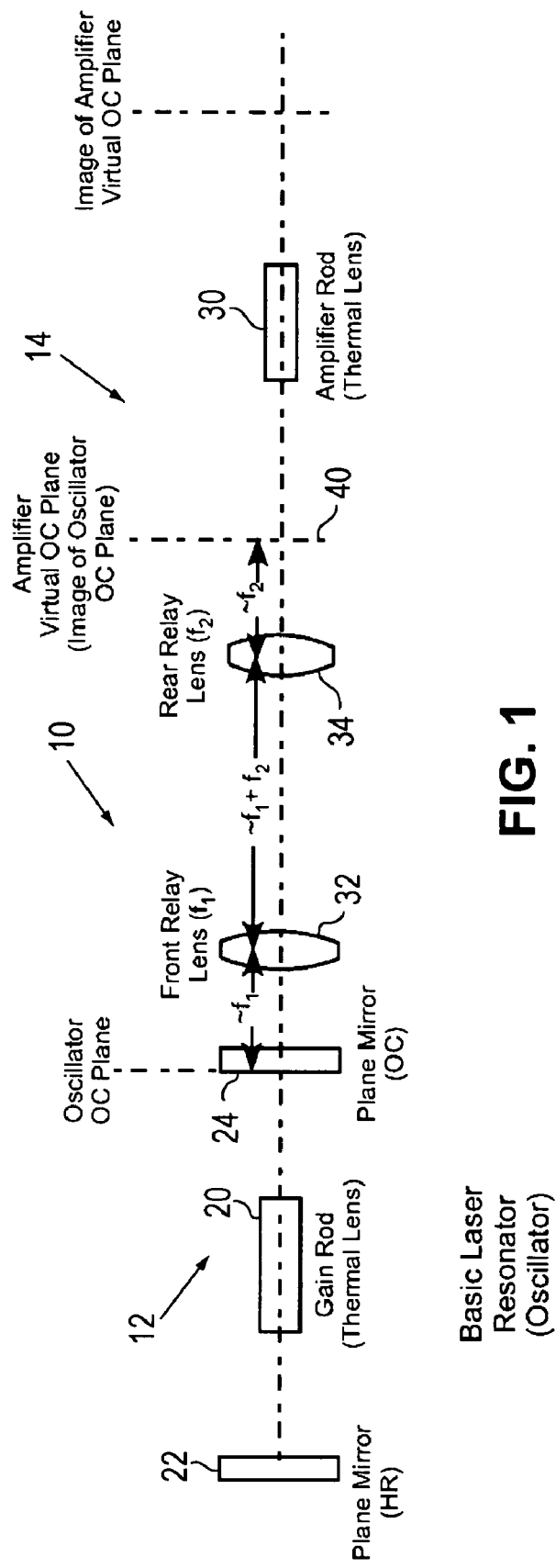
FIG. 1 is a diagram of a MOPA system with relay lens optics arranged in accordance with the subject invention.

FIG. 1 illustrates a MOPA 10 formed in accordance with the subject invention. MOPA 10 includes an oscillator 12. Oscillator 12 consists of a laser gain module (rod) 20 positioned between a high reflector 22 and an output coupler 24 from which the laser beam is emitted. In this embodiment, both reflector 22 and output coupler 24 are flat and preferably placed an equal distance away from the ends of the rod 20.

The laser rod 22, could for example, be formed from Nd:YAG. The rod can be side pumped by several diode bars (not shown). As is well known in the art, a water manifold can be provided for cooling the laser rod and diode bars to stabilize operation. The term "rod" is used in the subject specification and claims to define an elongated solid gain element. Laser rods are often cylindrical with a circular cross section but can also have other shapes such an elliptical or a rectangular with either a rectangular or square cross section.

Thermal Lensing

It is known that after reaching equilibrium, a parabolic temperature profile is formed along the radius of the laser rod if it is pumped uniformly, resulting in a similar refractive index variation in the following form:

$$n(r) = n_o(1 - \gamma r^2), \quad (1)$$

where $n_o$ is the refractive index at the center of rod and r the radius. Due to this parabolic refractive index distribution, a lens guide is formed, and in most of the applications where $2\gamma L^2 \ll 1$ holds, can be treated as a thick lens with a refractive power defined as $$\begin{aligned} D &\equiv 1/f \\ &= 2\gamma n_o L \\ &= P_{th}(dn/dT + \varepsilon)/(2\pi R^2 K), \end{aligned} \quad (2)$$

with
   L: the length of the laser rod,
   $P_{th}$: the total heat load,
   dn/dT: refractive index dependence of temperature,
   $\varepsilon$: refractive index dependence of stress,
   R: radius of laser rod, and
   K: thermal conductivity.

The heat load is related to the pump power (P) via $$P_{th} = \chi \eta_{ecit} P \quad (3)$$

where $\chi$ is the conversion factor of power available in the upper population inversion to thermal heat, and $\eta_{ecit}$ is the excitation efficiency. We can sum up all the material parameters of the laser rod into one factor C in equation (2) and (3), and find that the refractive power depends only on the pump power and the radius of laser rod:

$$D = CP/R^2 \quad (4)$$
$$= C_1/R^2,$$

with $C_1=CP$.

Flat/Flat Symmetric Oscillator

The oscillator 12 illustrated in FIG. 1, with a thermal lens representing the laser rod placed in the middle, forms a so-called flat/flat symmetric oscillator. This type of oscillator is well studied and the behavior can be can be described by the following equivalent g-parameter associated with an equivalent resonator length $L^*$:

$$g^* = 1 - Dd_a, \text{ and}$$
$$L^* = 2d_a - Dd_a^2, \quad (5)$$

where $d_a$ is the distance of the principal plane of the laser rod to the end mirror of the oscillator. In multimode operation where only the barrel of laser rod acts as a hard aperture, the circulating laser beam inside always fills the laser rod. The beam propagation factor $M^2$ of the output beam changes with pump power as the $TEM_{00}$ mode size changes, and can be expressed in terms of $g^*$ and $L^*$ as $$M^2 = (\pi R_a^2/\lambda L)(1-g^{*2})^{1/2}/[1+(d_a/L^*)(1-g^{*2})], \quad (6)$$

where $R_a$ is the radius of the laser rod and is chosen based on the application. The stability zone of the resonator starts at $D=0$ with zero pump power and ends with $D=2/d_a$. At the middle of this zone, $D=1/d_a$, $g^*=0$, and $M^2$ reaches its maximum value $$M^2_{max} = \pi R_a^2/(2\lambda d_a), \text{ or}$$
$$d_a = C_2 R_a^2, \quad (7)$$

where $C_2 = \pi/(2\lambda M^2_{max})$. Using equations (4) and (7) to replace $d_a$ and $D$ with $C_1$ and $C_2$, and rewrite $g^*$ and $L^*$ in terms of $C_1$, $C_2$ and $R_a$, one then finds the $M^2$ expression of eqn. (2) becomes a function that depends only on $C_1$ and $C_2$ $$M^2 = f(C_1, C_2). \quad (8)$$

The beam radius on the output coupler is $$\omega_o^2 = M^2(\lambda L^*/\pi)/(1-g^{*2})^{1/2}$$
$$= g(C_1, C_2)M^2 R_a^2.$$

The Proposed MOPA Design

Turning again to FIG. 1, the MOPA 10 further includes an amplifier stage 14. The amplifier stage 14 includes an amplifier rod 30. In addition, a pair of relay lenses 32 and 34 are provided for relaying an image of the output coupler 24 to a location in front of the amplifier rod 30 as discussed below. Using this system, the size of the beam at the entrance to the amplifier rod 30 will remain the same even if the pump powers are varied. In addition, the position and focal length of the relay lenses can be selected so the diameters of the resonator gain rod and the amplifier rod do not have to be the same.

In our approach, we treat the construction of the amplifier as a virtual flat/flat symmetric oscillator. In other words, we consider the amplifier stage as an oscillator with the amplifier rod surrounded with a virtual flat OC and a virtual flat HR placed with an equal distance ($d_b$) away from the rod. The rod radius ($R_b$) is chosen so that the power or energy density of the oscillator output beam, when delivered to the amplifier rod, is equal or higher than the saturation density of the laser rod material (0.21 J/cm² for Nd:YAG). The value $d_b$ is then chosen according to the following $$d_b = \pi/(2\lambda M^2_{max})R_b^2 \quad (10)$$

where $M_{max}$ is value of propagation factor of the oscillator output when it is operated at the middle of the stability zone (see equation (7)).

We connect the oscillator with the amplifier with a pair of relay lenses 32 and 34. As noted above, transferring an oscillator beam to the amplifier stage with a pair of relay imaging lenses has been proposed in high-energy flash lamp pumped systems. (See, J. T. Hunt, et. al., "Suppression of self-focusing through low-pass spatial filtering and relay imaging", Appl. Opt. 17, pp. 2053-2057 (1978)). In this prior art scheme, however, the rear end of the oscillator laser rod is imaged to the front end of the amplifier rod. The main focus of this prior art scheme is to preserve the flat-top beam profile out of the oscillator rod and to clean up any possible high-frequency structure in the beam to prevent optics damage. This prior art article did not address thermal lens issues. With the presence of a thermal lens in our MOPA system, the prior art scheme will not work. Instead, we propose to image the OC plane of the oscillator and send it to virtual OC plane of the amplifier.

This is achieved by arranging the elements such that (1) the distance between the OC 24 and the front lens 32 is equal to the focal length ($f_1$) of lens 32;

(2) the distance between lens 32 and lens 34 is equal to the sum of the focal length of both lenses; and (3) the distance between the lens 34 and the virtual OC plane 40 of the amplifier 14 equals the rear focal length $f_2$ of lens 34. Because the OC 24 is flat, the waist of the output beam always falls on it, and the relay lenses thus always deliver the output of the oscillator to the amplifier with a waist on the virtual OC plane, regardless of any pump power or thermal lens change.

If we set the diameters of both the oscillator rod 20 and the amplifier rod 30 to be the same and the set the distance between the end of the oscillator rod 24 and lens 32 and the virtual OC plane 34 to the amplifier rod 30 to be the same, i.e., $R_b = R_a$ and $d_b = d_a$, and pump the amplifier with a same current, then the virtual amplifier oscillator is just a duplicate of the master oscillator. A one-to-one imaging system ($f_1 = f_2$) that relays the oscillator output from its OC plane to the virtual OC plane of the amplifier will preserve the same waist size and the spatial mode profile and phase relationship on this plane, and the beam will expand, along its original divergence ($M^2$), into free space and reach the amplifier rod 30 with a beam size that matches the rod size $R_b$. With this perfect match, amplification efficiency is high. More importantly, as long as the pump power to both the oscillator and amplifier rods is set to be the same, the oscillator beam always matches that of the amplifier rod, regardless of different values of the pump power.

Other benefits of a symmetric oscillator include a large stability zone (i.e., a large range of pump power) and an even distribution of the laser beam size along the pump length of the laser rod, largest in the middle. The result of the latter feature is the highest degree of overlapping, compared to other types of oscillator, between the laser beam and the active volume of the laser rod, and a high gain is obtained in the amplifier and high amplification efficiency in the amplifier.

In the basic scheme described above, with the amplifier essentially a duplicate of the oscillator, it is straightforward to produce an efficient amplifier. In fact, one does not even need the relay lens pair if the amplifier rod is placed the same distance $d_a$ from the OC of the oscillator. (See, Shuichi Fujikawa, et. al., "1-KW high-quality beam generation from a diode-side-pumped Nd:YAG rod laser", paper WE-8, *Advanced Solid-State Lasers*, 2002, Quebec City, Canada.) However, the latter approach is not advantageous because it places limits on the size of the rod in the amplifier. It is preferable to design a system wherein the rods in the oscillator and the amplifier do not have to be the same size.

In equation (9) we find that the beam size on the output coupler of a flat/flat symmetric oscillator is determined by the pump power ($C_1$), the $M^2_{max}$ ($C_2$), $M^2$ value, and by the radius of the laser rod $R_a$. From equation (8), however, we also find that the $M^2$ value is a function of pump power and $M^2_{max}$. Thus, if the pump power to both the oscillator and the amplifier are synchronized so that equal pump power is applied to both stages, then the $M^2$ value of the virtual oscillator of the amplifier follows the same value as in the oscillator, regardless of pump power change. More importantly, the ratio of beam size on the two OC planes is always same, regardless of pump power variation:

$$\omega_o^a/\omega_o^b = R_a/R_b. \quad (11)$$

Thus, if we set the magnification factor of the relay lenses $f_2/f_1$ to the value of $R_b/R_a$, the oscillator beam size and the divergence ($M^2$) at its OC plane will vary as the pump power changes and its image on the virtual OC plane of the amplifier follows it, such that it will always expand with the proper size into amplifier rod and fully fill the rod.

Design Procedures

The last two sections can be summed up into the following procedures of the proposed MOPA laser:
1) Build the oscillator as a flat/flat symmetric resonator. Determine the rod size $R_a$ and $d_a$ of this oscillator based on performance requirements of the desired application. The maximum output divergence $M^2_{max}$ is related with these two quantities by equation (7).
2) Determine the rod size $R_b$ of the amplifier.
3) Treat the amplifier as a virtual flat/flat symmetric 'oscillator', with its virtual OC and virtual HR planes placed with an equal distance $d_b$ on both sides of the amplifier rod. Here $$d_b = (R_b^2/R_a^2)d_a. \quad (12)$$

4) Connect the two stages with a pair of lenses so that the OC plane of the oscillator is relay imaged to the virtual OC plane of the amplifier (see FIG. 1). The magnification of the lens pair is set by the ratio of the diameter of the laser rods in the two stages:

$$f_2/f_1 = R_b/R_a. \quad (13)$$

The distance between the two lenses is the sum of their focal lengths, and the distance $d_1$ and $d_2$ to the two OC planes are calculated through the following equation $$f_1 + f_2 = md_1 + d_2/m, \quad (14)$$

with $m = f_2/f_1$ the magnification factor of the lenses. Although we choose $d_1 = f_1$ and $d_2 = f_2$ in all the drawings and examples herein, other value of $d_1$ and $d_2$ can be selected that fits best to the design situation, as long as equation (14) is satisfied.

5) Pump the amplifier with the same power as the oscillator.

The following section gives some examples of the invention. The laser wavelength is 1.064 microns in all cases.

Figure 2:
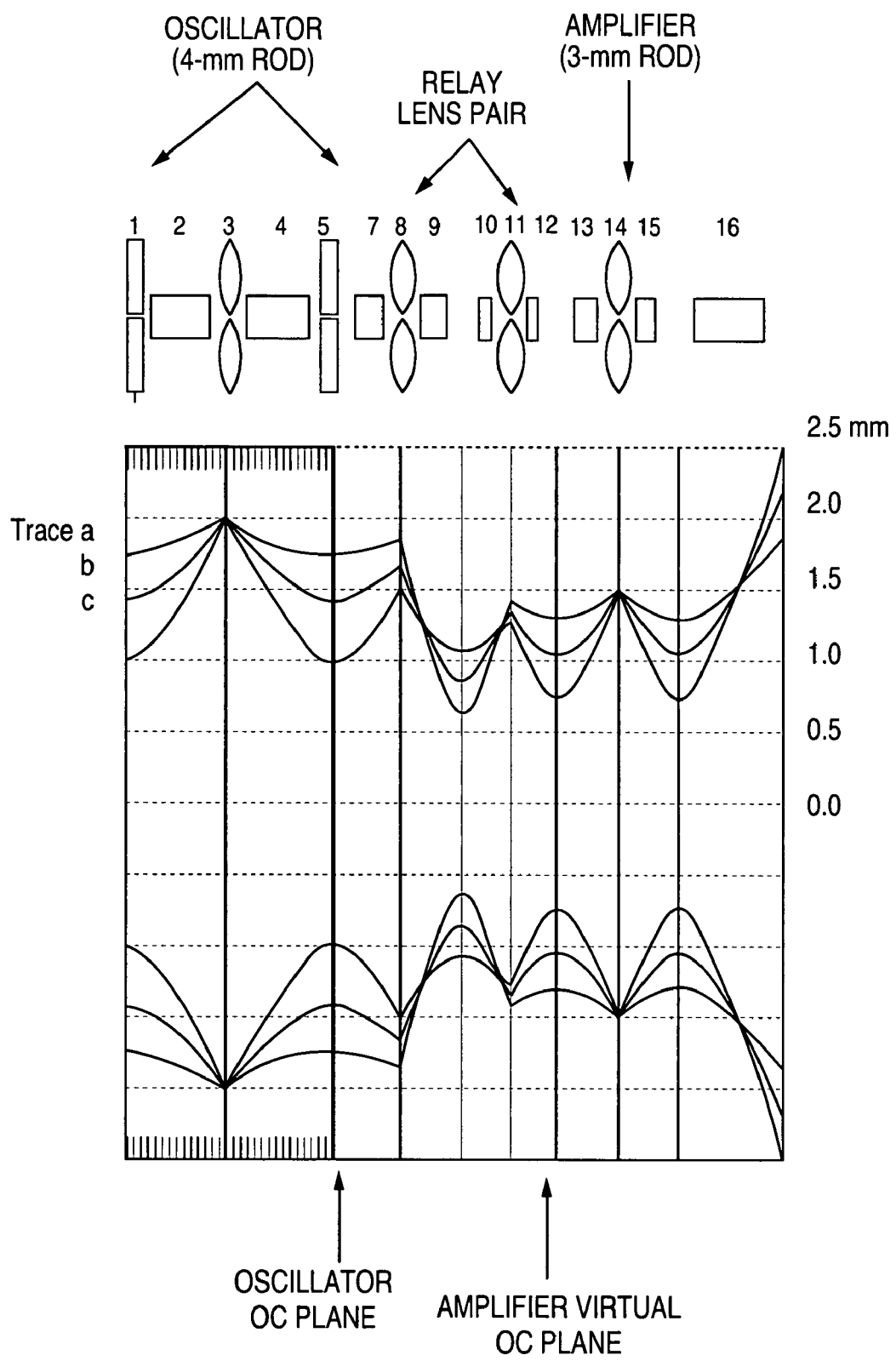
FIG. 2 is a plot of changing beam size in a MOPA configured in accordance with FIG. 1.

A Basic MOPA with One Amplifier:

FIG. 2 includes a graph plotting the size of the beam as it propagates along the axis of a MOPA formed in accordance with FIG. 1. The plots are generated by a software program based on ABCD matrix that calculates the laser beam size at each optic of the oscillator and the virtual oscillator of the amplifier (OpticsTool—proprietary to Coherent, Inc.). Other software commercially available such as Paraxia etc. could also be used for the purpose. MOPA beam size is shown along various optics of the MOPA. Regardless of pump power change, the oscillator output beam always fills up the amplifier rod. Notice that the amplifier rod size needs not be the same as the oscillator. Trace a: MOPA beam at low pump power. Trace b: MOPA beam at twice the pump power of trace a. Trace c: MOPA beam at three times the pump power of trace a. The optical elements of FIG. 2 as specified in Table 3 at the end of specification.

In this example, the thermal lenses in the oscillator and the amplified are simplified as thin lenses. The oscillator arm length $d_a$ is set to be 16.4 cm while the laser rod radius $R_a$ is 2 mm. Maximum $M^2$ value of 36 occurs (see equation 7) with a thermal lens of 16.4 cm. We select a laser rod radius of 1.5 mm for the amplifier. Following equation (12) and (13), the arm length of the virtual amplifier 'oscillator' and the beam size on the virtual OC plane should be three-fourths that of the oscillator.

Some of the results corresponding to different values of the pump power are listed in Table 1 below: a) low pump power, b) medium pump power that doubles the value in a), and c) high pump power three times that of a). In each case, the $M^2$ value is adjusted so that the maximum beam size in the (middle) oscillator rod is 2.0 mm, i.e., 31, 36 (i.e., $M^2_{max}$) and 31, respectively. We find that, indeed, the ratio of beam radius on the two OC planes is 0.75 in all three cases.

Relay lenses of $f_1 = 10$ cm and $f_2 = 7.5$ cm are used with $d_1 = 10$ cm and $d_2 = 7.5$ cm. For each different power (a-c), the software generates the multimode mode beam from the oscillator and sends it towards the relay lenses and the amplifier, with the specific thermal lens values in the two laser rods and a common $M^2$ value. As the beam travel along these optics, the software calculates the beam size at each optics and plot out the trace. The validity of the invention is tested by looking at the results and comparison of the three cases. FIG. 2 shows the three traces.

From here one can find that inside the oscillator, as the pump power increases, the laser beam size is reduced on the OC plane. On the virtual OC plane of the amplifier, the output of the oscillator beam always forms a waist here in all three traces. In addition, the feature of beam size variation regarding the pump change, i.e., smaller beam size verses high pump power, is reserved by relay imaging. Finally at the amplifier rod (location 14 in FIG. 2), all three traces show a same 1.5-mm beam size, exactly same as the rod size, thus supporting the validity of the invention.

TABLE 1

Beam radius calculated by OpticsTool at laser rod and OC of the oscillator and the virtual oscillator of the amplifier.

| Trace | Thermal Lens (cm) | | Beam Radius at Rod (mm) | | Beam Radius at OC (mm) | | Ratio | $M^2$ |
|---|---|---|---|---|---|---|---|---|
| | Oscillator | Amplifier | Oscillator | Amplifier | Oscillator | Amplifier | | |
| c | 10.9 | 6.15 | 2.0 | 1.5 | 0.9997 | 0.7500 | 0.75 | 31 |
| b | 16.4 | 9.23 | 2.0 | 1.5 | 1.414 | 1.061 | 0.75 | 36 |
| a | 32.8 | 18.5 | 2.0 | 1.5 | 1.732 | 1.299 | 0.75 | 31 |

A MOPA with Two Amplifiers

Figure 3:
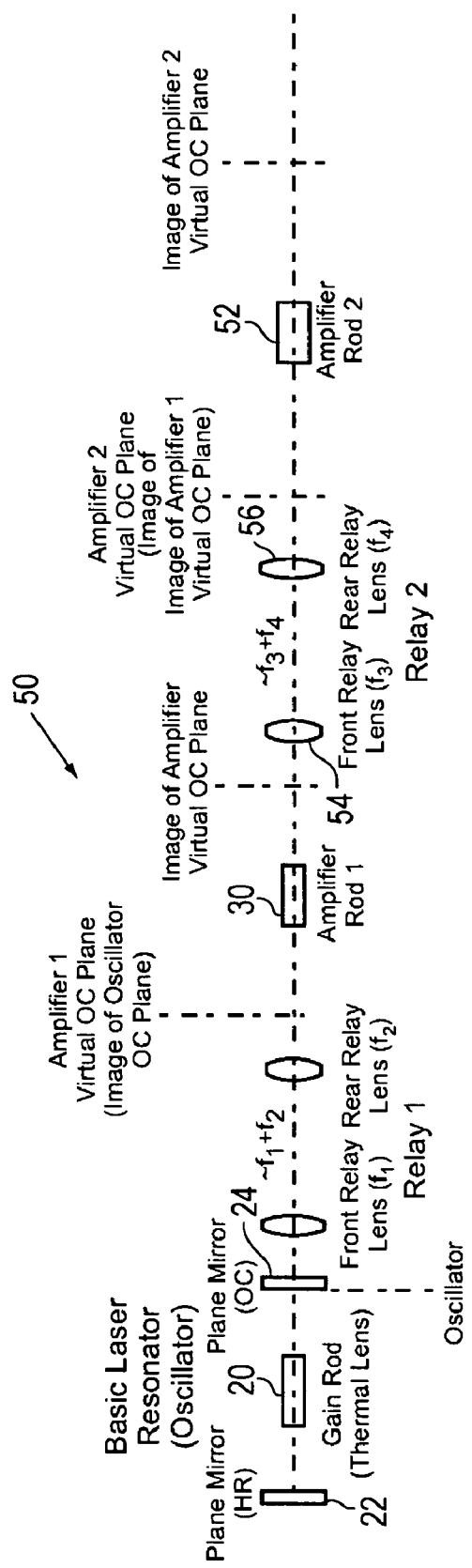
FIG. 3 is a diagram of a MOPA system with relay lens optics arranged in accordance with the subject invention and including a two stage amplifier.
Figure 4:
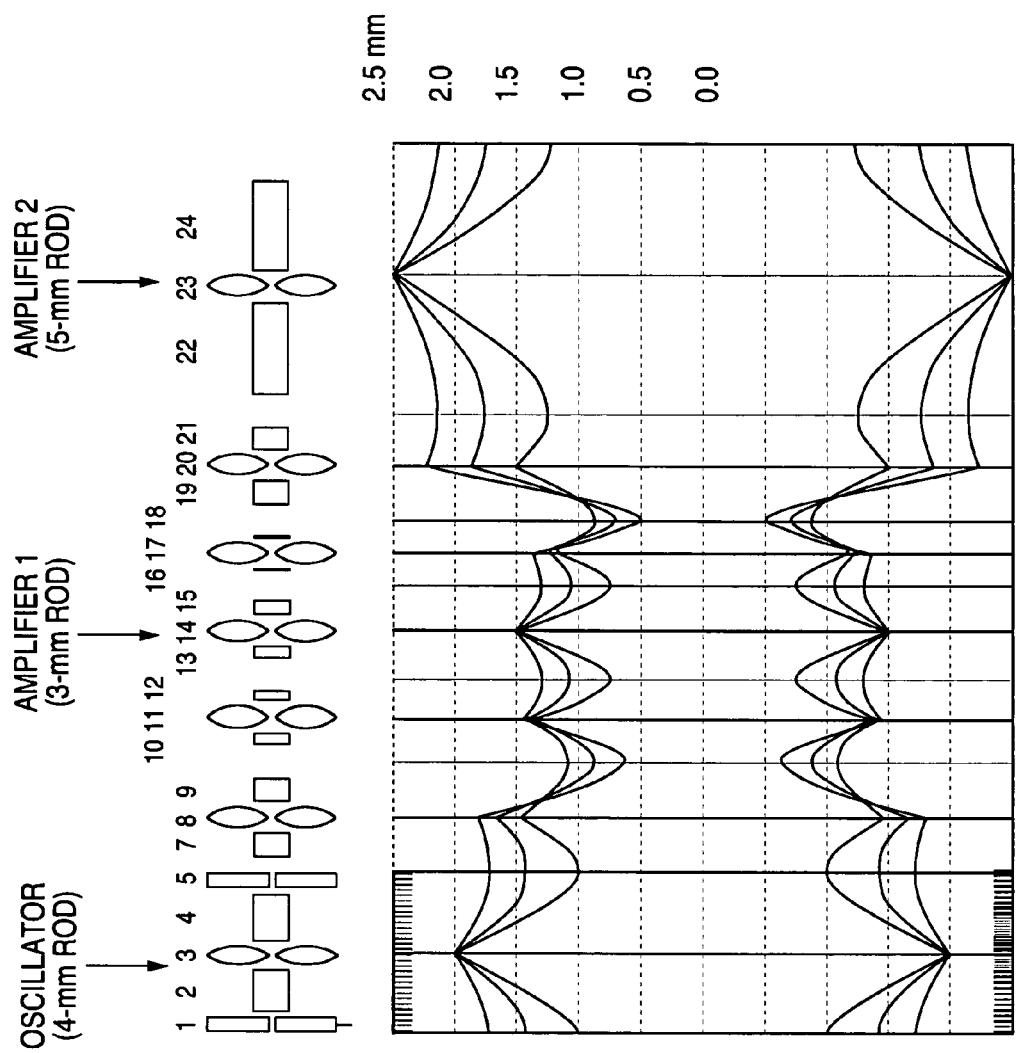
FIG. 4 is a plot of changing beam size in a MOPA configured in accordance with FIG. 3.

FIG. 3 illustrates a MOPA 50 which has two amplifier stages. The MOPA includes an oscillator 12 and a first amplifier stage 14 as in FIG. 1. The FIG. 3 embodiment includes a second amplifier rod 52 and a second pair of relay lenses 54 and 56. FIG. 4 includes a graph plotting the size of the beam as it propagates along the axis of a MOPA formed in accordance with FIG. 3.

Additional benefits of the invention are demonstrated in this example. More specifically, by setting up the amplifier as a virtual flat/flat symmetric oscillator, a virtual HR plane also exists behind the amplifier laser rod with a same distance ($d_b$) as that of the virtual OC plane in front of the rod. After the amplifier, the laser beam always forms a waist here regardless of specific pump power.

With this property, we can add more amplifiers and expect high amplification efficiency in these additional stages. The scheme works like this:

Treat each of the additional amplifiers as virtual oscillators, each setting their arm length (d) according to the laser rod size (R) that is chosen for the optimization of its amplification performance, i.e., $d = (R^2/R_a^2)d_a$. A relay lens pair is placed between two adjacent amplifiers to image the virtual HR plane of the front to the virtual OC plane of the rear, with the magnification ratio set to the ratio of rod sizes of the two amplifiers.

In the example of FIG. 4, the second amplifier includes a laser rod having a radius of 2.5 mm. The corresponding arm length of the virtual 'oscillator' of the second amplifiers is 25 cm, and the magnification ratio of 5/3 relay lens pair with $f_1=6$ cm and $f_2=10$ cm is chosen. Three values of the pump power are again examined with the corresponding three traces showing the laser beam size variation as it propagates along the MOPA system. These simulated results illustrate that all three traces of the laser beam fill up the two amplifier rods at locations 14 and 23 of FIG. 4.

In FIG. 4, a relay lens pair between the two amplifier rods images the virtual HR plane of the front amplifier to the virtual OC plane of the rear amplifier. The simulation demonstrates that the oscillator output beam always fills up both amplifier rods regardless of the pump power change. The three traces designate the same power level assignments as in FIG. 2.

A MOPA System with its Thermal Lens More Precisely Modeled

In the last two examples, the laser rod, either in the oscillator or in the amplifier, was treated as a thin lens. This analysis is valid when the effective focal length is much longer than the pump length of the laser rod. For a high-power laser which is CW pumped by laser diodes, especially when the rod diameter is less than one-quarter of an inch, the focal length is only two or three times larger than the pump length. In this case, the laser rod should be treated more rigorously than as a simple thin lens.

Figure 5:
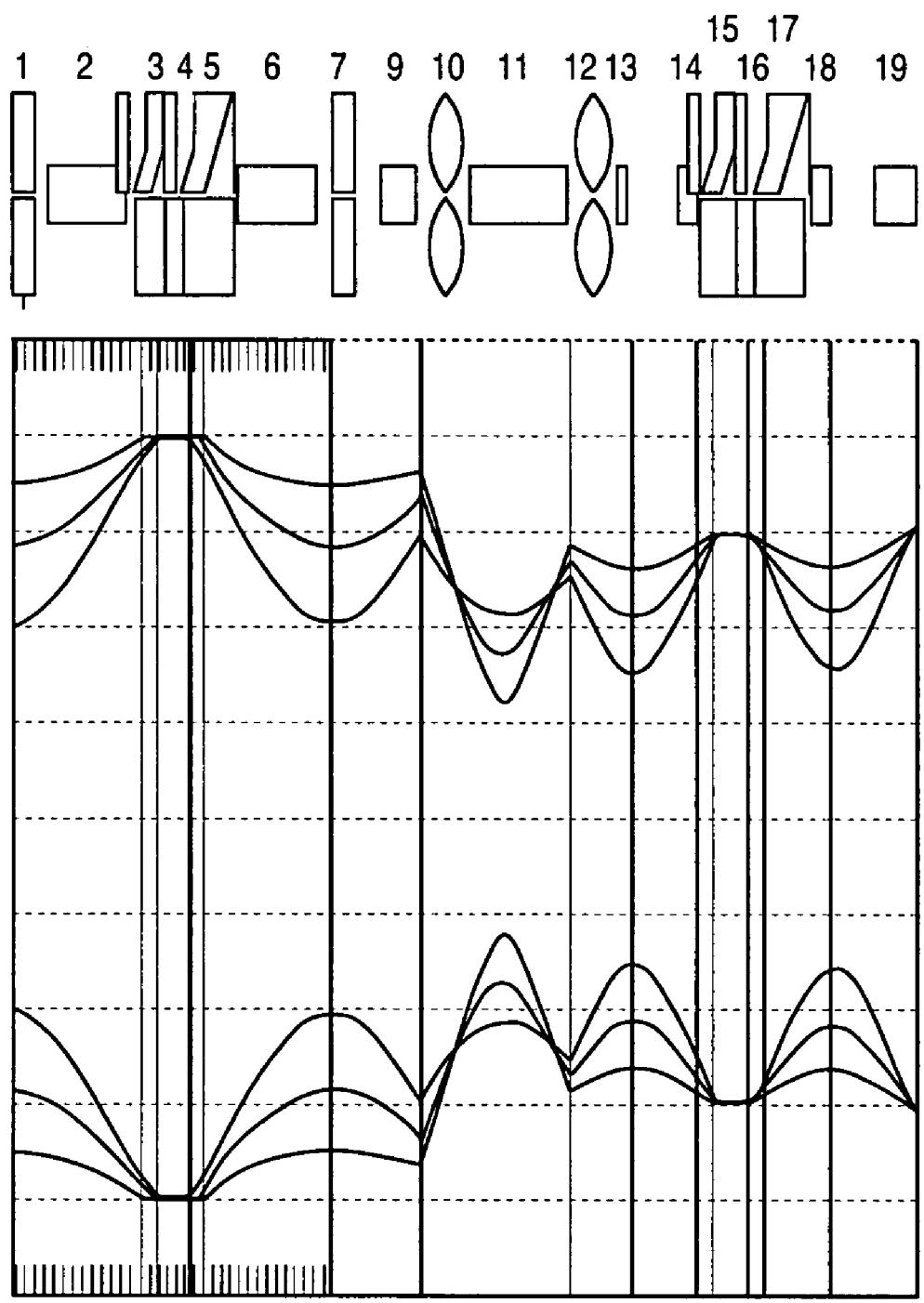
FIG. 5 is a plot of changing beam size in a MOPA of the type shown in FIG. 1 wherein a lens duct model is used to simulate the pumped section of the laser rods.

FIG. 5 is an illustration of a more precise model where a lens duct model is use to simulate the pumped section of the rod. (See Table 4 for list of the optical elements.) In this example, the length of the Nd:YAG rods in both the oscillator and amplifier is 76 mm, with the central 44-mm section pumped by 808 nm diode bars. Again, $M_{max}^2$ of 36 is chosen for the MOPA, with a rod radius of 2 mm and 1.5 mm for the amplifier.

For the pumped section having a parabolic refractive index profile as in equation (1), the lens duct model with the ABCD matrix accurately describes the bending action of the laser rod to the passing laser beam (See, D. Metcalf, P. de Giovanni, J. Zachorowski, and M. Leduc, "Laser resonator containing self-focusing elements", Appl. Opt. 26, pp. 4508-4517 (1987))

$$A=D=\cos\left[(2\gamma)^{1/2}L\right]$$

$$B=\sin\left[(2\gamma)^{1/2}L\right]/[n_o(2\gamma)^{1/2}]$$

$$C=-n_o(2\gamma)^{1/2}*\sin\left[(2\gamma)^{1/2}L\right]. \tag{15}$$

One can think of the duct as a thick lens, with an effective focal power of $$1/f=C=n_o(2\gamma)^{1/2}*\sin\left[(2\gamma)^{1/2}L\right] \tag{16}$$

measured from a distance h from the edge of the pump section:

$$h=\tan\left[(2\gamma)^{1/2}L/2\right]/[n_o(2\gamma)^{1/2}]. \tag{17}$$

Thus, with the view of a lens duct model, the laser rod acts as a thick lens with a 'moving' principal plane: the higher the pump power, the more it moves away from the edge of the pump section, making the effective arm length of the oscillator longer. In this sense, the laser oscillator can no longer be viewed as a thin lens sitting in the middle with a fixed distance to the OC or HR. On the other hand, if we expand equations (16) and (17) into a series:

$$1/f=(2\gamma n_o L)*(1-2\gamma L^2/6), \text{ and} \tag{18}$$

$$h=[L/(2*n_o)]*(1+2\gamma L^2/12), \tag{19}$$

the familiar the focal power, $2\gamma\, n_o L$ and principal plane location $L/(2*n_o)$ of the thin-lens model is easily recognized in the zero order. As long as this (nominal) zero-order focal power $L/f=2\gamma\, n_o L^2$ is less than $6*n_o$, the thin lens treatment of the laser rod is not too far away from the lens duct model. In addition, the focal power is smaller than its zero-order value. In other words, the focal power is retracting from that based on thin-lens model as the pump power increases, with a pace faster than the 'increase' of the effective arm length of the oscillator.

The same OpticsTool is used with a lens duct for the laser rods to simulate the laser beam size variation along the MOPA optics. For the given $M^2_{max}$ value, the arm length and refraction power are searched and located when the beam size at the middle of the laser rod matches that of the rod. In this way, the arm length (OC to the closest end of the laser rod) is calculated to be 14.9 and 7.74 cm for the oscillator and the virtual oscillator of the amplifier; the corresponding refractive power and beam radius at the OC plane at $M^2 = M^2_{max}$ are (142 diopter/meter, 1.414 mm) and (257 diopter/meter, 1.061 mm), respectively.

At a first glance, we notice that the ratio of calculated refractive power of the amplifier to the oscillator (257/142=1.810) is not exactly the ratio of the square of their rod sizes (16/9=1.778), although that of the beam radius at OC (1.061/1.414=0.75) is pretty close (3/4=0.75). So indeed the treatment of the long laser rods in this case as thin lens is not exactly valid.

The following table lists some important parameters of the MOPA at different pump powers. As in the former two examples, the same pair of lenses ($f_1$=10 cm and $f_2$=7.5 cm) is used to relay image the OC plane of the oscillator to the virtual OC plane of the amplifier. Calculated arm length values (14.9 and 7.74 cm) are used in the MOPA. Two situations are compared here: in one case (values in bold) the refractive power of the amplifier is set 16/9 times that of the oscillator, which is the situation when we set the pump power to the amplifier to be the same as to the oscillator. In another case, the refractive power of the amplifier is set to the value calculated based on the lens duct model, which is totally independent of the oscillator.

One can find from the comparison (also compare Table 2 with Table 1), that although the thin-lens assumption is not exactly valid in this example, the MOPA constructed following the same procedure as described above still delivers the oscillator beam to the amplifier with a beam size that matches fairly well with that of the amplifier rod. In FIG. 5, this situation is plotted to show the laser beam size variation at three different pump power values.

scheme with a single Nd:YAG rod placed in the oscillator or in the amplifier may not be a preferred one for a good MOPA system.

One of the issues is the high pump power density on the laser rod (see Table 1). A direct result is the rising negative effects such as spherical aberration that degrades the laser efficiency, worsens the beam quality and narrows the range of pump power in which the laser is stable. Pumping the rods harder will eventually crack them when the tensile stress limit is reached. Another issue is the thermally induced birefringence known to exist in a Nd:YAG rod due to the ellipsoid photo-elastic indicatrix under stresses created by the uneven temperature distribution in the rod.

One solution is to use two rods with a 90° quartz rotator in between in either or both of the oscillator or amplifier. When the pump power is equally divided into the two rods, the quartz rotator reverses the sign of the birefringence of one rod when the laser beam is sent to the other rod, thus offsetting the birefringence. Dividing the pump power into two rods in this birefringence compensation scheme also reduces the pump power density to each rod, creating a more benign laser behavior.

Figure 6:
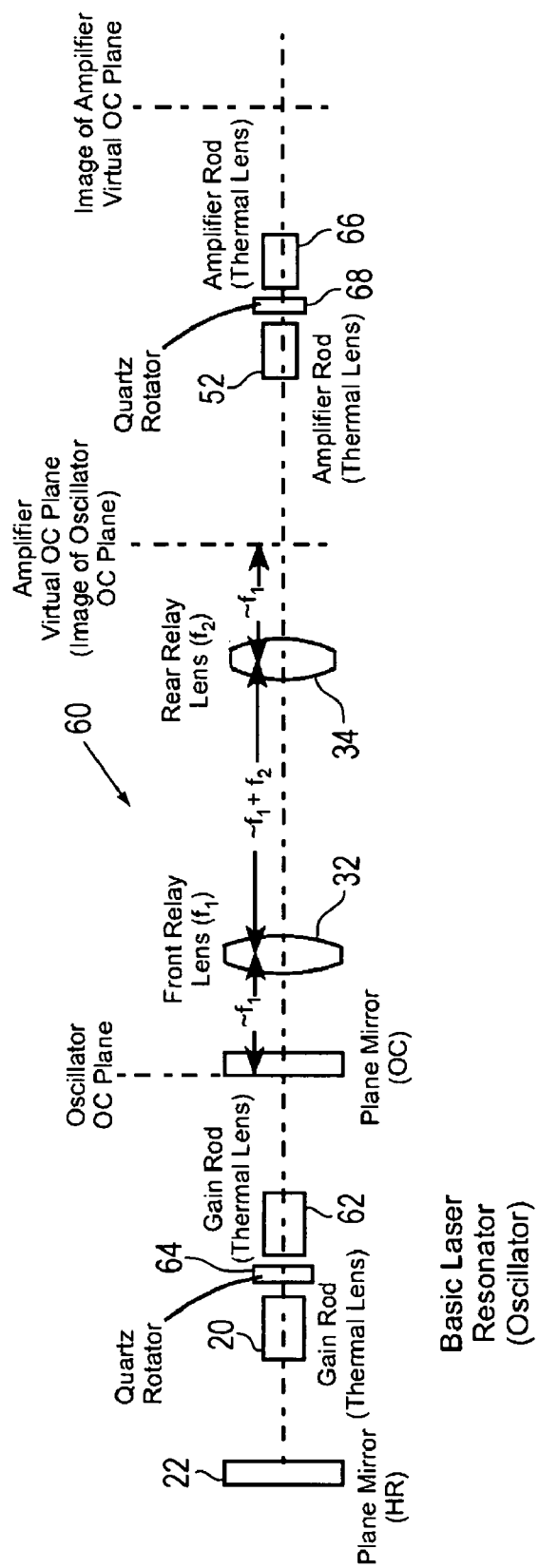
FIG. 6 is a diagram of a MOPA system with relay lens optics arranged in accordance with the subject invention and including a two stage oscillator and a two stage amplifier.
Figure 7:
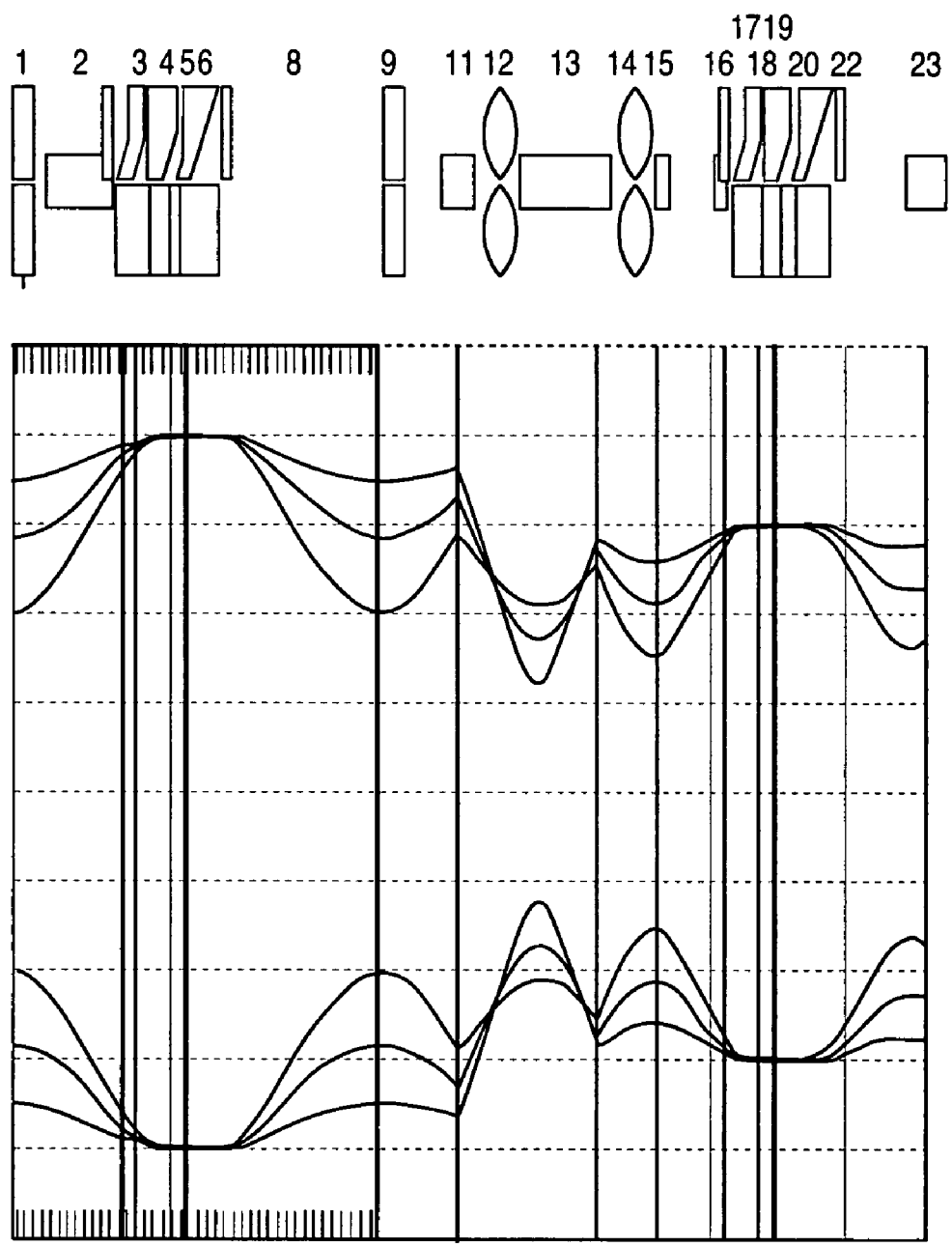
FIG. 7 is a plot of changing beam size in a MOPA configured in accordance with FIG. 6 using a lens duct model to simulate the pumped section of the laser rods.

FIG. 6 is a diagram in of this type of system 60. The oscillator of system 60 includes a second rod 62 and a quartz rotator 64. In addition, the amplifier includes a second rod 66 and a quartz rotator 68. This system is modeled in FIG. 7. (See Table 5 for a list of the optical elements.)

In this example, we still model the laser rods as lens ducts. Each of the oscillator and amplifier uses two 76-mm long Nd:YAG rods closely sandwiching the quartz rotator 64, with a respective rod radius of 2 mm and 1.5 mm as in previous samples. In each rod, only the central 44-mm section is pumped by 808-nm diodes. As usual an $M^2_{max}$ of 36 is chosen. The value of the arm length, 14.37 cm and 7.25 cm for the oscillator and the amplifier, respectively, is calculated with the OpticsTool software. Then the beam size variation across the MOPA is simulated with the refractive power of the amplifier rods set to the 16/9 ratio of the oscillator, corresponding to the proposed MOPA construction method where the pump power to the amplifier is set to be same as the oscillator. As shown in beam traces of FIG. 7, the overlap of the oscillator beam with the amplifier rods is quite good.

TABLE 2

Parameters of the MOPA at different pump power.

| Refractive Power in Lens Duct (diopter/meter) | | Equivalent Thermal Lens (cm) | | Beam Radius (mm) | | | | Beam Radius at Amplifier Rod |
|---|---|---|---|---|---|---|---|---|
| Oscillator | Amplifier | Oscillator | Amplifier | OC | Virtual OC | Ratio | $M^2$ | (mm) |
| 72.665 | 132.4 (129.18) | 31.68 | 17.58 (18.00) | 1.727 | 1.2950 (1.2953) | 0.75 | 31 | 1.499 (1.500) |
| 142 | 257 (252) | 16.42 | 9.26 (9.44) | 1.414 | 1.0610 (1.0605) | 0.75 | 36 | 1.499 (1.500) |
| 210.795 | 379.5 (374.7) | 11.20 | 6.41 (6.49) | 1.008 | 0.7572 (0.7560) | 0.75 | 31 | 1.499 (1.501) |

Values shown in bold type are the results of amplifier refractive power following that of the oscillator with a 16/9-ratio (square of ratio of rod size), which is based on the assumption that the pump power to both stages is same.

A MOPA System with Two Gain Rods in Both the Oscillator and the Amplifier

Figure 8:
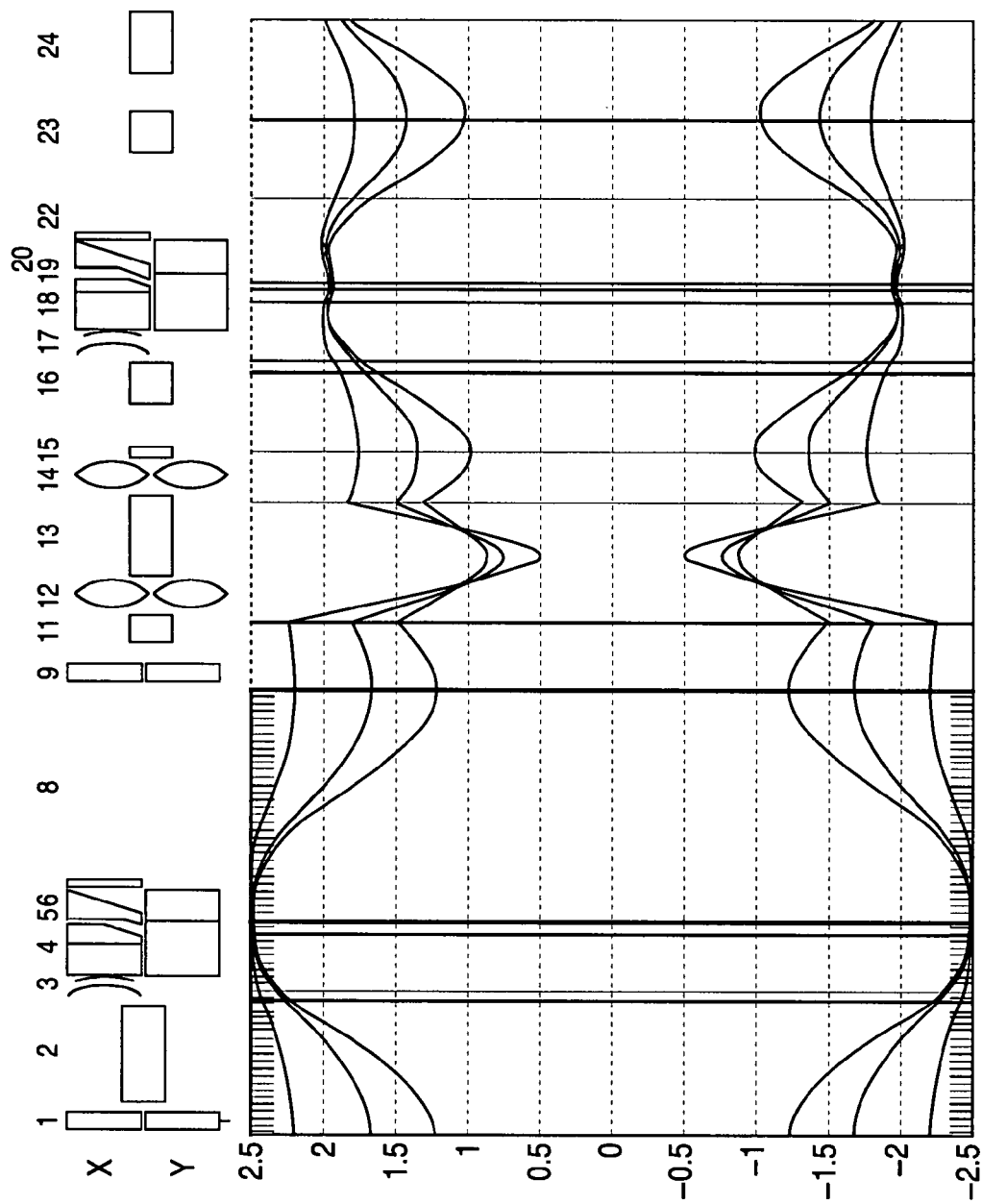
FIG. 8 is a plot of changing beam size in a MOPA with relay lens optics arranged in accordance with the subject invention wherein a lens duct model is used to simulate the pumped section of the laser rods and wherein the rods have concave ends.

In the last example, although we deal with the thermal lens of the laser rods with the more accurate lens-duct model, the Rods with Concaved Ends So far we assumed flat/parallel ends on the laser rods. There are situations that require laser rods with concaved ends. For example, if we want to double the output of the MOPA of the last example but keep other parameters such as pulse width and $M^2$ of the beam same, one solution is to use the same MOPA structure but choose a rod radius of 2.5 mm in the oscillator and 2.0 mm in the amplifier. To keep the $M^2$ same, we have to have a longer arm length in the oscillator to accommodate the larger laser rods. To keep the laser working at around the middle of the stability zone, though, the higher refraction power due to the high pump power requires that a shorter arm length be used in the oscillator. This conflict can be resolved by using laser rods with concaved ends. The negative lens created by these ends offsets the positive thermal lens, thus effectively reducing the overall thermal lens of the rods. FIG. 8 shows beam traces for a system using laser rods with concaved ends. (See Table 6 for a list of the optical elements.)

Curved End Mirrors in the Oscillator

In all the examples discussed above, the end mirrors in the oscillator were flats. In the cases where end mirrors with a certain radius of curvature (ROC) are preferred over flat mirrors, the principle of this invention can still be used, as long as the oscillator is still of the 'symmetric' type. In other words, the construction of the oscillator should be arranged in such a way that the dynamics of the oscillator, as is represented in the so-called $g_1 g_2$ diagram, crosses the origin of the diagram as pump power varies. In this case, the two stability zones of operation in an otherwise 'asymmetric' oscillator merge into one in the symmetric case. If we labeled the ROC and the distance of the mirror to the closest end surface of the laser rod as R and L, respectively, then the following relation between the two mirrors should be satisfied to form a symmetric oscillator:

$$L_1 \left(1 - \frac{L_1}{R_1}\right) = L_2 \left(1 - \frac{L_2}{R_2}\right)$$

(See, Vittorio Magni, "Resonators for solid-state lasers with large-volume fundamental mode and high alignment stability", Appl. Opt. 25, pp. 107-117 (1986).)

In this example, we choose $R_1 = -1$ meter and $L_1 = 20$ cm for the output coupler (OC) while the end mirror $R_2 = -5$ meter, respectively. The negative sign placed in the ROC values indicates that both mirrors are convex. From these given numbers, the end mirror distance $L_2$ is set to be 23 cm according to the above equation. The laser rod diameter of the oscillator and the amplifier is 5 and 4 mm, respectively.

As in other examples, the arm length of the amplifier is then decided by the power-of-2 rule:

$$\begin{aligned}(\text{arm length})_{amplifier} &= (OC \text{ length})_{oscillator} * \left[\frac{(\text{rod diameter})_{amplifier}}{(\text{rod diameter})_{oscillator}}\right]^2 \\ &= 20 * (4/5)^2 \\ &= 12.8 \text{ cm}\end{aligned}$$

Imaging lenses with $f_1 = 5$ cm and $f_2 = 4$ cm are chosen, with the distances from OC of oscillator to $f_1$ lens, between $f_1$ and $f_2$ lenses, and from $f_2$ to the 'virtual' OC plane of amplifier, are $f_1$ (5 cm), $f_1 + f_2$ (9 cm) and $f_2$ (4 cm). In such way, the OC of the oscillator, as in other examples, is relay imaged onto the virtual OC of the amplifier with a reduction factor of ⅘ to shrink the input beam correctly so that it matches the smaller amplifier rod with it reaches the rod.

The introduction of a finite ROC on the mirrors of the oscillator, however, necessarily introduces an additional lensing effect to the oscillator. In this case, the convex surfaces of the mirrors add a negative (expanding) bias to the focal power of the oscillator, as compared to case with flat end mirrors. To counter this effect, a negative lens is added on the virtual OC plane of the amplifier. The focal length of this lens, $f_{amplifier}$, is, again, determined by the power-of-2 rule as following:

$$\begin{aligned}f_{amplifier} &= (R_{OC}/2)_{oscillator} * \left[\frac{(\text{rod diameter})_{amplifier}}{(\text{rod diameter})_{oscillator}}\right]^2 \\ &= (R_1/2) * (4/5)^2 \\ &= 50 * (4/5)^2 \\ &= 32 \text{ cm}.\end{aligned}$$

Figure 9:
FIG. 9 is a plot of changing beam size in a MOPA with relay lens optics arranged in accordance with the subject invention wherein the resonator mirrors of the master oscillator have focal power.

The plot in FIG. 9 shows two different pump power values—the lower curve at the top of the Figure is 1.45 times higher in pump power than upper curve. As can be seen, the oscillator beam is correctly relay imaged into the amplifier and fully fills up the amplifier rod.

Figure 10:
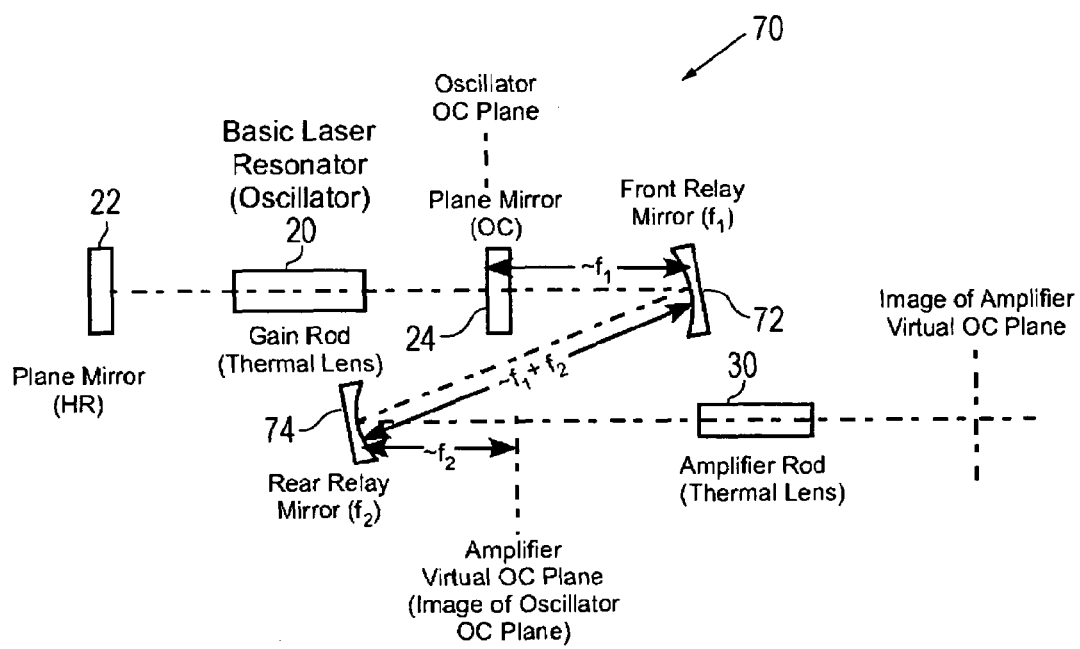
FIG. 10 is a diagram of a MOPA system similar to FIG. 1 except that the relay optics are formed using mirrors.

FIG. 10 is a diagram of a MOPA 70 generally following the structure of FIG. 1 but using two reflective mirrors 72 and 74 to form the relay optics instead of the lenses 32 and 34 of FIG. 1.

Figure 11:
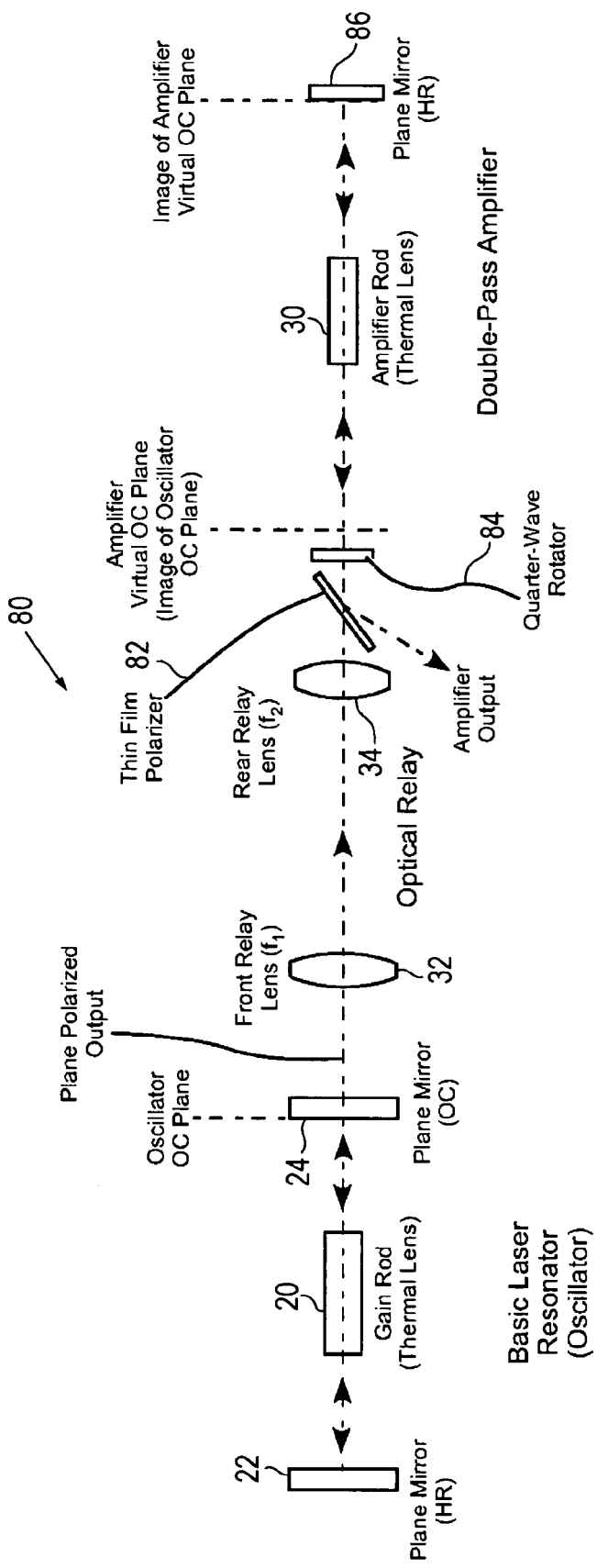
FIG. 11 is a diagram of a MOPA system with relay lens optics arranged in accordance with the subject invention and including a double pass amplifier.

FIG. 11 is a diagram of a MOPA 80 where the light is double passed through the amplifier rod 30. In this embodiment, light from the oscillator 12 first passes through a polarizer 82 for polarizing the beam. The light then passes through a quarter waveplate 84 prior to entering amplifier rod 30. Light emitted from the amplifier rod is reflected back into the rod via mirror 86. This light will pass through the quarter waveplate a second time. The two passes through the waveplate 84 will result in the polarization being rotated by ninety degrees. Polarizer 82 will then reflect the light out of the propagation path.

While the subject invention has been described with reference to a preferred embodiment, various changes and modifications could be made therein, by one skilled in the art, without varying from the scope and spirit of the subject invention as defined by the appended claims.

TABLE 3

| | |
|---|---|
| 1 | high reflector |
| 2 | space (16.4 cm) |
| 3 | oscillator thermal lens |
| 4 | space (16.4 cm) |
| 5 | output coupler |
| 7 | space (10 cm) |
| 8 | relay front lens (f = 10 cm) |
| 9 | space (10 cm) |
| 10 | space (7.5 cm) |
| 11 | relay rear lens (f = 7.5 cm) |
| 12 | space (7.5 cm) |
| 13 | space (9.26 cm) |
| 14 | amplifier thermal lens |
| 15 | space (9.26 cm) |
| 16 | space (arbitrary) |

TABLE 4

| | |
|---|---|
| 3, 5, 15, 17 | un-pumped ends of laser rods |
| 4, 16 | central 44-mm pumped section of laser rods |

TABLE 5

| | |
|---|---|
| 3, 4, 5 | un-pumped, pumped and un-pumped section of one laser rod |
| 6 | the 2 mm space between the laser rod and the quartz rotator |
| 7 | one half of the quartz rotator |

TABLE 5-continued

| | |
|---|---|
| 8 | one half of the quartz rotator |
| 16 | front arm of the amplifier |
| 17-22 | the rod-rotator-rod amplifier |

TABLE 6

| | |
|---|---|
| 1-9 | Oscillator |
| 17-22 | Amplifier |
| 12/14 | relay lenses ($f_1/f_2$ = 10/8 cm) |

What is claimed is:

1. Laser apparatus, comprising:
a laser resonator terminated by first and second mirrors, said second mirror being an outcoupling mirror of the resonator and defining an outcoupling plane;
an optically-pumped, resonator gain-medium located in said laser resonator, said resonator gain-medium having a thermal lens effect the magnitude of which is dependent on the power of said optical pumping, and said laser resonator being arranged to deliver a beam of laser radiation from said second mirror when said resonator gain-medium is optically pumped;
an optical amplifier including an optically-pumped, amplifier gain-medium;
an optical relay having a relay magnification, said optical relay being located between said laser resonator and said optical amplifier and arranged to deliver said beam of laser radiation from said second mirror of said resonator to said amplifier gain-medium, said relay magnification and the distance between said optical relay and said second mirror of said laser resonator being selected such that said outcoupling plane is imaged by said optical relay in an axial position between said optical relay and said amplifier gain-medium.

2. The apparatus of claim 1, wherein said resonator gain-medium is in the form of a rod having a first diameter and said amplifier gain-medium is in the form of a rod having a second diameter and said relay magnification is about equal to the ratio of said second diameter to said first diameter.

3. The apparatus of claim 1, wherein said optical relay includes first and second optical elements having positive optical power and having respectively first and second focal lengths, said optical elements being spaced apart by about the sum of said focal lengths, with said first optical element being spaced apart from said second mirror by about said first focal length, and with said image of said outcoupling plane being spaced apart from said second optical element by about said second focal length.

4. The apparatus of claim 3, wherein said first and second optical elements of said optical relay are lenses.

5. The apparatus of claim 3, wherein said first and second optical elements of said optical relay are mirrors.

6. A master oscillator power amplifier system comprising:
a master oscillator having a first gain rod located between two resonator mirrors, with one of said resonator mirrors functioning as an output coupler, said master oscillator further including a first optical pump source for exciting the first gain rod to generate a beam of laser light;
a second gain rod located outside the master oscillator and spaced from the output coupler and positioned to receive laser light emitted from the output coupler;
a second optical pump source for exciting the second gain rod to amplify the light received from the output coupler; and
an optical relay arranged to relay an image of the laser beam at the output coupler to a location between the output coupler and the second gain rod and arranged such that the beam substantially fills the second laser rod regardless of variations in the amount of pump power that is delivered to the rods.

7. The apparatus of claim 6, wherein said first and second rods are cylindrical and wherein the optical relay has a magnification which is about equal to the ratio of the diameter of the second rod to the diameter of the first rod.

8. The apparatus of claim 6, wherein said optical relay includes first and second optical elements having positive optical power and having respectively first and second focal lengths, said optical elements being spaced apart by about the sum of said focal lengths, with said first optical element being spaced apart from said output coupler by about said first focal length, and with the relayed image being spaced from the second optical element about said second focal length.

9. The apparatus of claim 8, wherein the output coupler is a flat mirror.

10. The apparatus of claim 6, wherein the output coupler is a flat mirror.

11. The apparatus of claim 6, wherein said master oscillator includes a third gain rod and where a quartz rotator is located between the first and third gain rods.

12. The apparatus of claim 6, wherein the first and second pump sources are synchronized to supply substantially similar power to the respective gain rods.

13. The apparatus of claim 6 further including:
a third gain rod located downstream from said second gain rod and positioned to receive laser light emitted from the second gain rod;
a third optical pump source for exciting the third gain rod to amplify the light received from the second gain rod; and
a second optical relay located between the second and third gain rods and arranged to relay an image of the laser beam at the output coupler which exists at a position beyond the second gain rod to a location closer to the input of the third gain rod and arranged such that beam substantially fills the third laser rod regardless of variations in the amount of pump power that is delivered to the rods.

14. A master oscillator power amplifier system comprising:
a master oscillator having a first cylindrical gain rod located between two planar resonator mirrors, with one of said resonator mirrors functioning as an output coupler, said master oscillator further including a first optical pump source for exciting the first gain rod to generate a beam of laser light;
a second cylindrical gain rod located outside the master oscillator and spaced from the output coupler and positioned to receive laser light emitted from the output coupler, with the diameter of the second gain rod being different from the diameter of the first gain rod;
a second optical pump source for exciting the second gain rod to amplify the light received from the output coupler, with the outputs of the first and second optical pumps sources being synchronized; and
an optical relay arranged to relay an image of the laser beam at the output coupler to a location between the output coupler and the second gain rod, said optical relay having a magnification which is about equal to the ratio of the diameter of the second rod to the diameter of the first rod.

15. The apparatus of claim 14, wherein said optical relay includes first and second optical elements having positive optical power and having respectively first and second focal lengths, said optical elements being spaced apart by about the sum of said focal lengths, with said first optical element being spaced apart from said output coupler by about said first focal length, and with the distance between the second optical element and the relayed image being about said second focal length.

16. The apparatus of claim 15, wherein the output coupler is a flat mirror.

17. The apparatus of claim 14, wherein the output coupler is a flat mirror.

* * * * *